March 14, 1961 — I. H. POLK ET AL — 2,974,776
PACKAGE DISTRIBUTING EQUIPMENT
Filed June 1, 1954 — 3 Sheets-Sheet 1

INVENTORS
ISAAC H. POLK
JOHN C. KOCH
BY
ATTORNEY

March 14, 1961     I. H. POLK ET AL     2,974,776

PACKAGE DISTRIBUTING EQUIPMENT

Filed June 1, 1954     3 Sheets-Sheet 2

INVENTORS
ISAAC H. POLK
JOHN C. KOCH
BY
ATTORNEY

March 14, 1961
I. H. POLK ET AL
2,974,776
PACKAGE DISTRIBUTING EQUIPMENT
Filed June 1, 1954
3 Sheets-Sheet 3
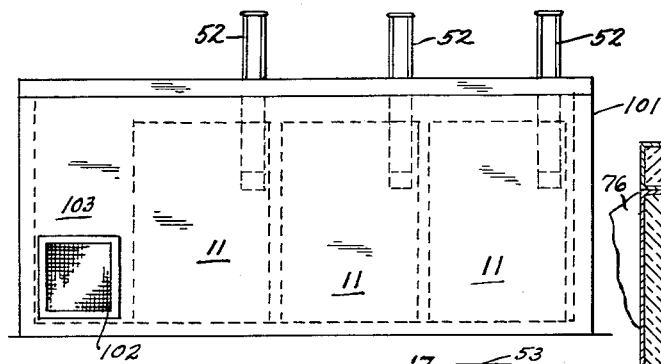
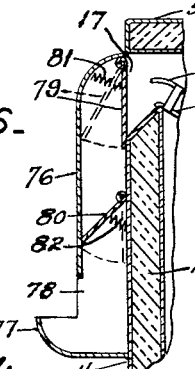
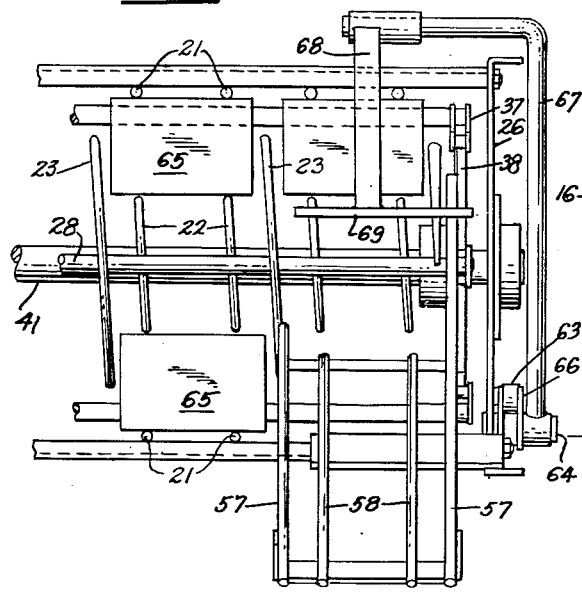
INVENTORS
ISAAC H. POLK
JOHN C. KOCH
BY Arlington C. White
ATTORNEY United States Patent Office 2,974,776
Patented Mar. 14, 1961

2,974,776
PACKAGE DISTRIBUTING EQUIPMENT

Isaac H. Polk, San Jose, and John C. Koch, Campbell, Calif., assignors, by direct and mesne assignments, to John Drum, Morris Lowenthal, and Harold A. Kuhn Filed June 1, 1954, Ser. No. 433,443

2 Claims. (Cl. 198—46)

The invention, in general, relates to material handling equipment and more particularly relates to improved distributing equipment for temporarily storing as well as moving about therein and therethrough a multiplicity of articles of various types, including articles and commodities contained in cases, cartons, packages and the like.

Our invention has application to a wide variety and range of industrial, commercial and governmental uses, and can be exemplified in numerous types and sizes of equipment. For purposes of explanation solely, we are herein illustrating and describing our improved equipment in the environment of frozen comestibles, whether the equipment be utilized primarily for purposes of handling such material in a storage and distribution plant or whether the equipment be exemplified in a commercial machine, such as a vending machine.

A primary object of our invention, as exemplified in equipment for handling frozen comestibles, is to provide an insulated enclosure in which confined air is maintained in a cold dry condition whether the air remains quiescent or is subjected to motion.

Another important object of our present invention is to provide an improved method of handling material in and through an insulated enclosure which method is characterized by the maintenance of the humidity of the atmosphere within the enclosure substantially constant under dynamic as well as static conditions.

A still further object of our invention is to provide improved equipment of the aforementioned character wherein mechanism for moving the articles or commodities is in static balance when the equipment is not in operation, and such mechanism virtually remains in static balance irrespective of the load applied thereto.

Another important object of the invention, as exemplified in equipment for handling frozen comestibles, is to provide an insulated enclosure having its inlet and outlet disposed in predetermined spaced relation to the evaporator surface or surfaces contained in the enclosure to avoid the likelihood of convective currents occuring within the enclosure during the admission, storage, conveying and discharge of individual packages into, within and from the equipment.

A still further object of our invention is to provide improved equipment of the indicated nature in which the likelihood of development of frost adhesions between the contained packages or upon any fixed or moving segment of the conveyor is reduced to a minimum.

A still further object of the present invention is to provide improved equipment of the aforementioned character which includes a movant for the packages which periodically disengages from the packages, each such disengagement changing the line of contact between the packages and the movant.

Another object of the invention is to provide equipment of the indicated nature which is operable from a single source of power and wherein motive forces applied to packages in no way deface or deform any package in its conveyance through the equipment, and applied forces readily rupture any frost adhesions which might possibly develop between the packages.

A still further object is to provide improved equipment for distribuiting and dispensing separate packages or units in which the packages at no time come in contact with any segment of the conveyor which is not either a point of tangency with a circle or a line of tangency with a cylinder, and this obtains for movement of the packages in both forward and reverse directions through the equipment.

Other objects of the invention, together with some of the advantageous features thereof, will appear from the following description of a preferred embodiment of our invention as exemplified in a machine for storing, distributing or vending individual packages of ice cream. It is to be understood, however, that we are not to be limited to the precise embodiment shown, nor to the precise arrangement of the various parts thereof, as our invention, as defined in the appended claims, can be embodided in a plurality and variety of forms.

Referring to the drawings:

Fig. 3 is a reduced, schematic side elevational view of a preferred embodiment of our invention as exemplified in a multiple unit structure with discharge openings omitted, the dotted lines illustrateing partitions between the several units.

Fig. 4 is an enlarged fragmentary top plan view of the conveying and discharge means of a preferred embodiment of the invention.

Fig. 5 is a sectional elevational view, in reduced scale, taken on the line 5—5 of Fig. 1, with discharge conveyor omitted.

Fig. 6 is a reduced fragmentary, sectional elevation of an end of the insulated enclosure.

In its preferred form, the improved package distributing equipment of our present invention preferably comprises an insulated enclosure, the atmosphere within a major portion of which is maintained dehydrated at all times, and means including mechanism located and operative within said enclosure for feeding a plurality of packages successively into and out of said insulated enclosure without affecting the function of said mechanism. Our improved method of distributing, conveying or dispensing articles or packages preferably comprises the steps of feeding a plurality of the articles successively into and out of an insulated enclosure while maintaining a low relative humidity of the atmosphere constant in a major portion of said enclosure under dynamic as well as static conditions.

Figure 1:
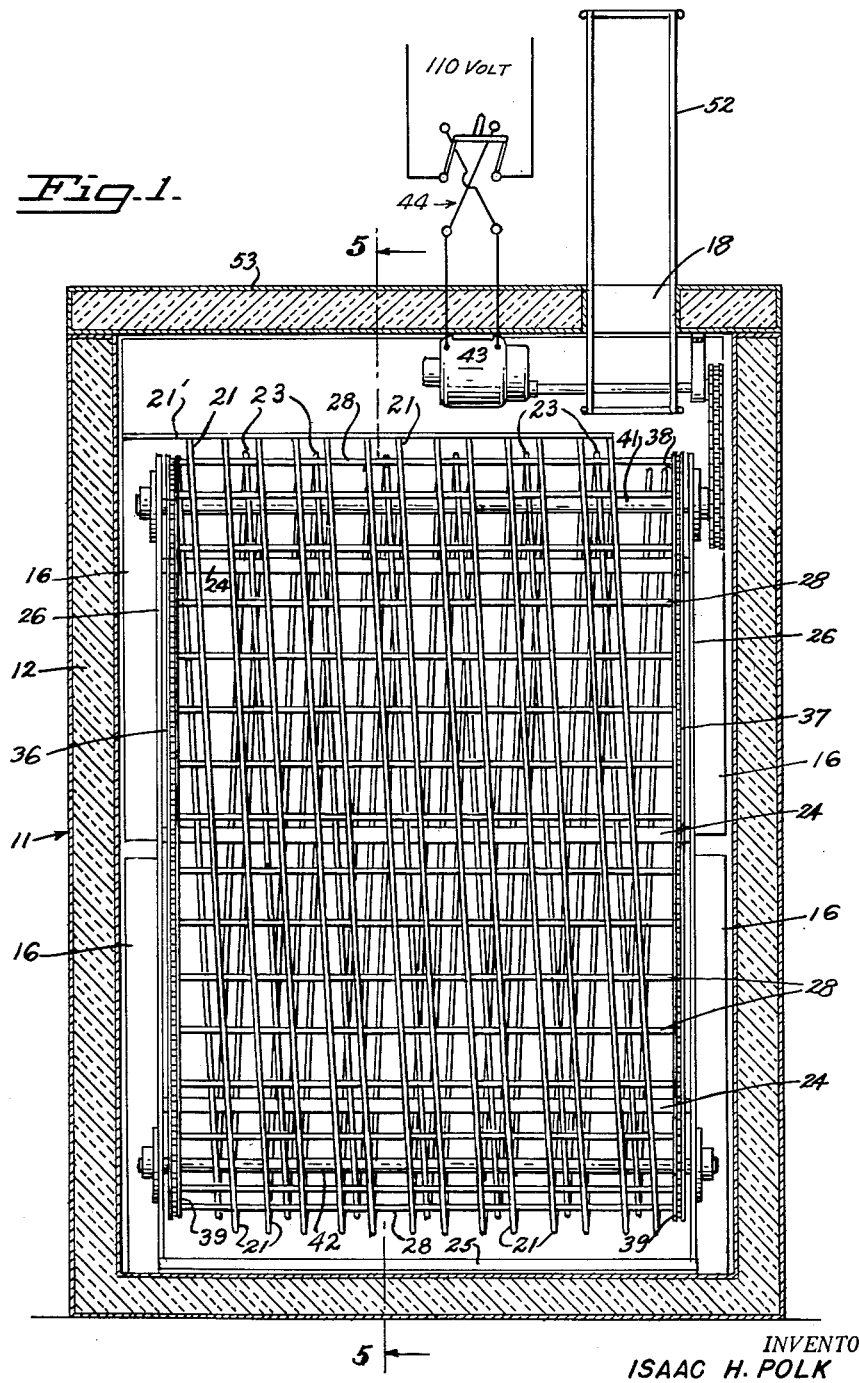
Fig. 1 is a front elevational view of a preferred embodiment of our invention, this view showing the insulated enclosure thereof in section.
Figure 2:
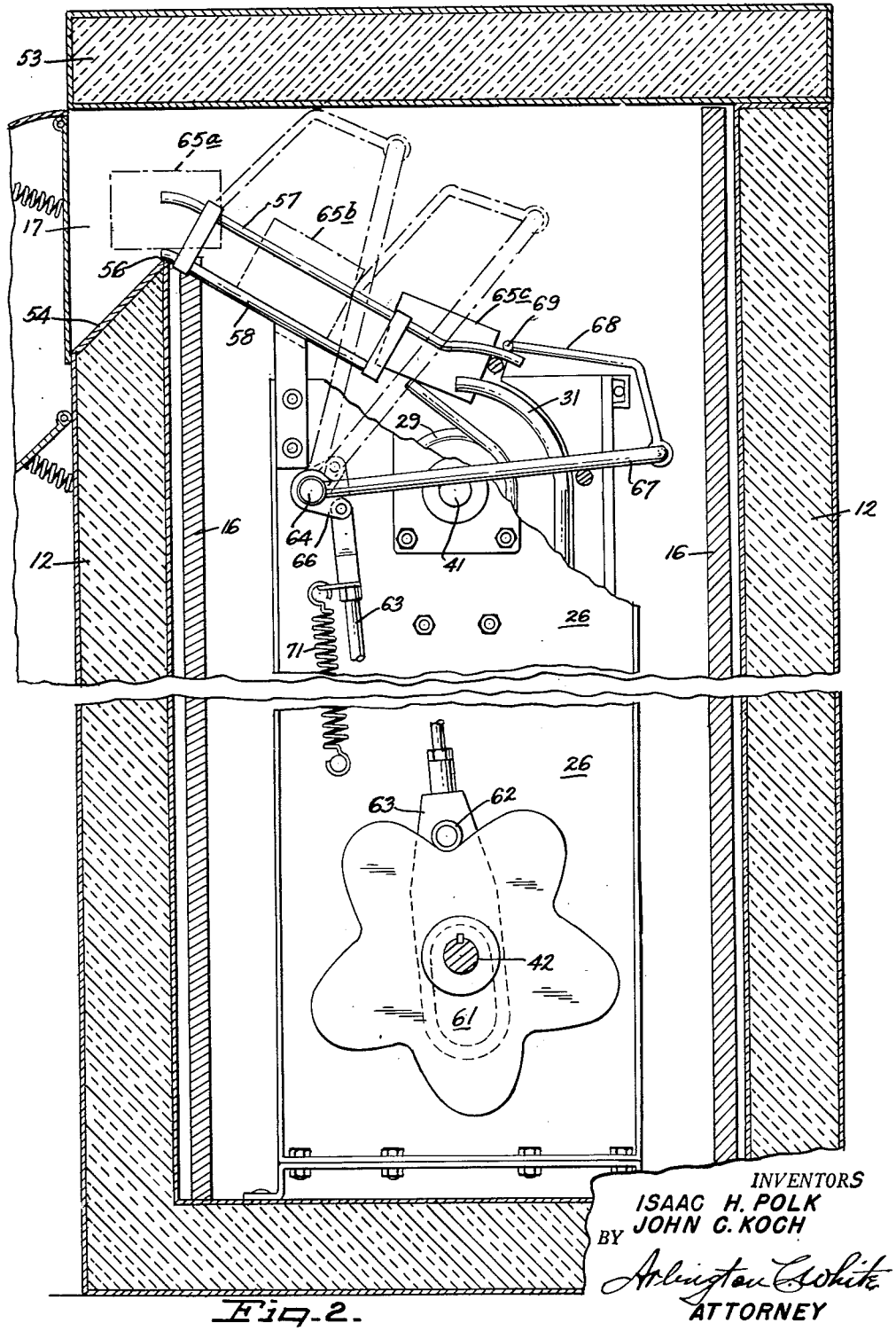
Fig. 2 is a broken, side elevational view of the embodiment illustrated in Fig. 1 and showing several positions of the package discharging arm thereof.

As illustrated particularly in Figs. 1 and 2 of the accompanying drawings, we provide an insulated enclosure or cabinet which is designated generally by the reference numeral 11 and which preferably is fabricated of a suitable light-weight metal, such as aluminum or light-weight steel or steel alloy, lined on all of its interior walls with heat insulation material 12. In all exemplifications of our improved distributing equipment for handling frozen foods, ice cream and the like the cabinet 11 is so formed as to provide therein a relatively deep interior well for housing the hereinafter described mechanism for moving articles or packages in both directions end to end through the insulated enclosure 11; and we provide in said cabinet means for maintaining a cold dry atmosphere in the deep well section thereof below the only outlet of the cabinet. In the particular embodiment herein illustrated and described, which has been devised especially for the distribution and vending of ice cream and which has undergone severe performance tests heretofore in excess of 600 hours, the cabinet construction affords a relatively narrow width with respect to its length and height.

In accordance with our present invention, as applied to storing, distributing and dispensing, including vending, of frozen comestibles and other articles, the means which we provide for maintaining a dehydrated atmosphere in a major portion of the insulated enclosure 11, and which affords two different temperature zones therein, termed herein an upper or condensing zone and a lower dry or dehydrated zone, comprise a material portion of our invention in the equipment combination and in the method of storing, conveying and dispensing of substances and articles. These means preferably comprise refrigeration elements consisting of a standard motor-driven compressor, not shown, serving a plurality of conventional evaporator surfaces, shown in block schematic view and designated by the reference numeral 16, which are specifically arranged with relation to the outlet 17 and the inlet 18 of the cabinet 11. The plane of demarcation between the above-mentioned two zones; namely, the upper or condensing zone and the lower dry or dehydrated zone, being at an elevation which is the same as the elevation of the lowest point of the discharge outlet 17 of the cabinet.

As particularly shown in Fig. 2 of the annexed drawings, we have provided evaporator surfaces 16 at opposite sides of the enclosure 11, which conveniently may be divided into an upper set and a lower set of evaporators, and our special arrangement of the upper set of evaporators 16 within the insulated enclosure provides for the placement of one of the upper set of evaporators 16 at one side of the enclosure so that its top is at the same elevation in the cabinet as the lowest point of the discharge outlet 17, while the placement of the other of the upper set of evaporators 16 at the opposite side of the enclosure 11, is such that its top is in proximity to the inner wall of the top of the cabinet. As shown, the outlet 17 is formed in the cabinet as close to the top thereof as is possible. By such disposition of the upper sets of evaporators 16, with particular relation to the outlet 17, there is established within the deep well of the cabinet an upper condensing zone and a lower dry dehydrated zone wherein the colder air in such lower zone denies admittance of lighter moisture-laden outside air, irrespective of the type of closure uitilized in the package discharge outlet 17, and limits condensation and subsequent moisture to the upper or condensing zone. This relation between the upper sets of the evaporators 16 and the discharge outlet 17 further limits the admission of air to the insulated enclosure 11, during the discharge of a package, to a volume of air equal to that displaced by the package. It is manifest that such a small volume of air periodically coming into contact with the cold interior of the cabinet will abruptly give up its heat and moisture and thus leave the relative humidity and temperature of the interior unaffected. As is well known, so long as the temperature of the air within the interior of the enclosure 11 is lower than atmospheric temperature there is no possibility of convection currents forming within the enclosure which will draw heated moisture-laden air from the outside into the enclosure when the only openings are in or adjacent to the top of the cabinet.

This condition will persist whether or not the air within the enclosure is quiescent or in motion. Under optimum conditions of temporarily storing frozen comestible packages in the cabinet and periodically removing such packages for distribution to other units, either stationary or mobile, or for vending directly from the cabinet 11 to purchasers, the temperature of the air strata embracing the uppermost row of such packages within the cabinet must be at or near 0° F., irrespective of the temperature of the lower stratas, all of which naturally will be below 0° F. in the case of carrying frozen foods, ice cream and the like in the insulated enclosure 11. Thus, we provide a cold or condensing zone and a colder or dehydrated zone within a space of predetermined dimensions in the enclosure for a given quantity of such packages, and the cabinet will accommodate as many packages of any given size or weight as possible within the smallest cubic space consistent with a required capacity, and wherein the inlet 18 through which the packages are introduced into as well as the outlet 17 from which the packages are discharged from the insulated enclosure are both above the maintained colder dry zone, as indicated, and within the warmer or cold zone of the enclosure 11.

The mechanism which we preferably employ for effecting movement of individual articles and packages, as well as for temporarily storing them within the insulated enclosure 11, comprises a package guide race defined by an outer package guide 21, an inner guide 22, and an intermediate package guide 23. The outer package guide 21, except for being open at the top, constitutes an irregular helix and the inner guide 22 and intermediate guide 23 are also irregular helices in that each of the guides is formed with true helical curved sections at its top and bottom, except as to the outer guide 21 which is formed with true helical curved sections at its bottom only, which are joined together by means of straight sections arranged tangentially to their respective curved sections of the irregular helices. The entire race is supported in an upright position within the colder zone of the insulated enclosure by means of a framework, including a plurality of cross-braces 24, a base 25 disposed on the inner bottom wall of the enclosure, a pair of end plates 26 extending normal from the base 25 and to which the cross-braces 24 are secured, together with a plurality of short transverse struts 27. The inner irregular helix 22 is welded or otherwise secured to the cross-braces 24 and is secured by means of transverse struts 27 to the intermediate irregular helix 23, with the outer helix 21 secured by means of its straight sections to cross-bars 21' at the top of the enclosure. Due to limitations of drawing, only one cross-bar 21' is shown in Fig. 1, although it should be understood that two of such cross-bars are used front and back to which the straight sections of outer helix 21 are secured at their tops; each of such front and back cross-bars 21' at one end thereof conveniently being welded to the evaporators 16. Moreover, Fig. 1 does not show the inner irregular helix 22 since it lies directly behind the outer helix 21 when the mechanism is viewed from the front; such inner irregular helix 22 and its relation to the other helices being depicted in Fig. 5.

The irregular helices 22 and 23 preferably are each formed with true helical curved sections 29 and 31, respectively, approximating 180° each, at its top and bottom and such curved sections are joined by straight sections 32 and 33, respectively, which are arranged tangentially to their respective curved sections 29 and 31 of the inner irregular helix 22 and the intermediate irregular helix 23. Moreover, the top and bottom curved sections 29 and 31 of the inner irregular helix 22 have the same radius but a radii which is appreciably less than the radii of the curved sections 29 and 31 of intermediate irregular helix 23 so that a space is provided therebetween defining an irregular helical path of travel for articles or packages, with the outer helix 21 serving as an outer package guide rail. In addition to the structures comprising the outer helix 21, inner irregular helix 22 and intermediate irregular helix 23, the aforesaid mechanism includes a plurality of package retaining and package advancing members 28, such as rods, which are movably mounted in spaced relationship and arranged for movement in a path lying within but closely adjacent to the straight and curved sections of outer helix 21; such mounting and arrangement affording tangential engagement of the rods with each package either on points of a circle or on lines of tangency to a cylinder.

During their travel through insulated enclosure 11 of our improved distributing equipment, the individual packages are lowered and lifted in alternate helical paths and thereby moved along longitudinally of the enclosure by the members or rods 28 for ultimate discharge successively from the cabinet. And, by virtue of the disposition of the evaporators 16 in the exemplification of our equipment in the accompanying drawings, as well as the helical structures 21, 22 and 23 within the deep well of the enclosure 11, the individual packages for the most part are moved through, or are retained in, the dry or dehydrated zone of the enclosure 11, although for a fractional portion of their duration within the cabinet, such as when being fed into the enclosure or while being ejected from the cabinet, the packages are in the condensing zone. As indicated above, a preferred means of moving the packages comprises the plurality of spaced apart advancing members or rods 28; and these rods are connected to and driven by a pair of endless chains 36 and 37 which are movably mounted at opposite ends of the enclosure 11 on aligned pairs of upper and lower sprocket gears 38 and 39, respectively, keyed or otherwise secured to upper and lower shafts 41 and 42, respectively. The shafts 41 and 42 are conveniently journaled in bearings supported in the end panels of the cabinet, and a single prime mover, such as a reversing motor 43, Fig. 1, is placed in driving connection with upper shaft 41 for effecting, through the medium of the chains 36 and 37, the driving in unison of the upper and lower shafts as well as the movement of the members 28 in a defined path within the outer helix 21 in either direction of rotation so that such members 28 tangentially engage the packages individually throughout the irregular helical path in which the packages are caused to move. In Fig. 1, we have shown schematically a portion of an electrical circuit supplying current to the motor 43, together with a reversing switch 44 connected into the circuit which may be thrown from one to another position for reversing the motor 43.

As particularly illustrated in Figs. 1 and 3 of the accompanying drawings, the cabinet 11 is formed with its inlet 18 in the top and adjacent one end thereof, and we provide at the top and in registry with inlet 18 a magazine or housing 52 for receiving and passing individual packages of frozen foods, ice cream and the like to the inlet 18; the magazine 52 being open both at its top and bottom and having dimensions accommodating the packages to be fed into the insulated enclosure 11. The magazine 52 extends below the top and into the cabinet through the inlet 18 thereof whereby the lowermost package of a stack of superposed packages in the magazine 52 will seat, when the machine is at rest, upon one of the rods 28 and within the first flight of the package guide race defined by the package guides 21, 22 and 23. By first flight is meant that flight of the race underlying the inlet 18. Upon starting the motor 43 to effect movement of the rods 28 in one direction of rotation, one of the rods will engage the lowermost package to move it and cause it to drop onto a leading rod 28 which will immediately lower the package in the first flight of the race from the condensing zone at the top of the enclosure 11 into the lower dehydrated zone thereof. In the meantime, as the first package is being lowered, the succeeding lowermost package in the magazine 52 is pushed by the next succeeding rod 28 onto the first-mentioned rod 28 of the group of moving rods; this package also being lowered from the condensing zone into the dehydrated zone and within the first flight of the race. Continued operation of the motor in the same direction of rotation will move each of the packages from the first to the next and to succeeding flights of the race from one end of the enclosure 11 to the other. It will be noted that in passing from the first flight to the second flight of the race, each of the successive individual packages rests on one of the rods 28 which lifts the packages through the second flight, lowers them again through the third flight and alternately lifts and lowers the packages throughout the flights which, of course, effects movement of the packages from one end to the other end of the enclosure through the irregular helical path defined by the irregular helices 21, 22 and 23 to the point of discharge.

With particular reference to Figs. 2 and 4 of the accompanying drawings, it will be observed that we form the outlet 17 in one of the side panels and opposite to the end of the cabinet adjacent to which the inlet 18 is provided, such outlet 17 being located adjacent to the top 53 of the cabinet and being so formed as to provide an incline or chute 54 down which the discharged or vended packages slide for reception ultimately in the hands of a purchaser or receptacle of a distributee.

In accordance with our invention and as shown in Fig. 2 of the annexed drawings, the irregular helices 22 and 23 are functionally extended by providing an upwardly projecting guideway or path defined by inclined elements 57 and 58, see Fig. 4, which are arranged in alignment with and, in effect, are extensions of the inner and intermediate structures 22 and 23; such elements projecting slightly through cabinet outlet 17 adjacent to its lowermost point 56, or top of chute 54.

We also provide means for moving individual articles or packages successively up the inclined path or guideway defined by elements 57 and 58 to the top of chute 54 in response to the operation of the equipment either upon the dropping of a coin in coin-actuated apparatus, not shown, if associated with the motor 43, or other movement of the shaft 41 which, in turn, effects movement of chains 36 and 37, as well as the package advancing rods 28 to effect movement of the packages and articles through the insulated enclosure 11. These means for successively discharging the individual articles or packages, designated generally by the reference numeral 65, in Fig. 4 of the drawings, conveniently comprise a cam 61 which is keyed to lower shaft 42 of the drive mechanism, a cam follower 62, a cam follower arm 63 having a bi-furcated head for securing the arm to shaft 42 and upon which the cam follower 62 is rotatably mounted; said head having an elongated opening therein for passing the shaft 42, together with a stub shaft 64 journaled in an end panel of the cabinet 11 at the discharge end thereof; such shaft 64 being oscillatably mounted and oscillated through the medium of a link 66 secured thereto and to which the cam follower arm 63 is pivotally connected, and a push-rod 67 secured to stub shaft 64 for movement therewith. The package discharging means includes a finger 68 rockably mounted on the outer end of push-rod 67 and so arranged that the end 69 of finger 68 overlies the straight path defined by the inclined elements 57 and 58 of the irregular helices 22 and 23. As each package 65 approaches the discharge outlet of the cabinet 11, the end 69 of finger 68 engages the back of each package and, through the action of the cam follower 62, arm 63 and push-rod 67, pushes each package over the top 56 of chute 54. On each revolution of the cam 61, the finger 68 advances to push a package, through the medium of finger end 69, to and through the outlet 17 and thereafter retreats to its initial position to place the finger end 69 behind a succeeding package in order to advance the succeeding package up the incline and through the outlet 17 on the next advancing stroke of the finger 68. On the return stroke of finger 68, the finger end 69 rides over the top of the next succeeding package by virtue of the rockable mounting of the finger 68 on the end of the push rod 67; the next succeeding package being in a position to strike the finger 68 and cause the same to lift and to cause the finger end 69 to ride over the top of such package. In Fig. 2 of the annexed drawing, the successively discharged packages have been designated 65a, 65b and 65c, this view showing the various positions of finger 68 and its end 69 on the advancing and return strokes of the finger. A tension spring 71, connected to cam follower arm 63 at its one end and to the frame at its other end, serves to return the arm after each rise thereof and to maintain the cam follower 62 in engagement with cam 61; it being understood, of course, that equivalent means for effecting this purpose may be substituted for spring 71 if desired.

With reference to Fig. 3 of the annexed drawings, it is to be observed that a series of insulated enclosures 11 can be arranged side by side within a refrigerator unit 101 and a compressor 102 installed therein for effecting the desired cold and colder zones within each enclosure 11 through association with the evaporator surfaces therein, not shown in this view. By such arrangement, additional space 103 above the compressor 102 is provided for storing a considerable volume of individual packages of frozen comestibles which, if desired, may be stacked in superposed relation on a single tray, not shown, movably mounted in space 103 and capable of being raised by any suitable means such as a pneumatic or hydraulic jack, all not shown, for placing the packages in readiness for filling magazines 52 and ultimate passage through any one of the insulated enclosures 11 shown. If desired, a single large insulated enclosure 11 may be substituted for the three enclosures 11 shown in dotted lines in Fig. 3.

While any suitable outlet receptacle may be associated with discharge outlet 17 and chute 54 of the cabinet 11, in our present embodiment we have utilized an outlet receptacle 76 of the type illustrated in fragmentary view in Fig. 2 and in reduced view in Fig. 6. As shown, the receptacle 76 is secured to the cabinet 11 in communication with outlet 17 thereof and extends downwardly therefrom along a side panel of the cabinet to terminate in a bottom 77 opening to the exterior through a front opening 78 of the receptacle. We provide within the receptacle 76 a pair of spring-controlled closures or baffles 79 and 80 of which the closure 79 is hingedly secured at the inner top of the receptacle normally to cover the outlet 17 of the cabinet; such closure 79 terminating at the outer end of chute 54. When a package 65 slides down chute 54 it opens closure 79 against the action of its associated spring 81 and drops down toward the bottom 77 of the receptacle. The other closure or baffle 80 is hingedly secured to the end panel of the cabinet to swing downwardly against the action of its associated spring 82. After a package passes gate or closure 79 it promptly returns to its initial position overlying outlet 17 of enclosure 11 thus keeping ingress of air into the cabinet at a minimum. Similarly, after baffle 80 has swung downward by the passage of a package to the bottom of receptacle 76, the baffle immediately returns to its initial position under influence of its associated spring 82 to extend across the receptacle and thus trap ingress of air to the insulated enclosure. Consequently, the amount of ambient air entering the enclosure through outlet 17 at the time of discharge of an individual package is about equal to that displaced by the outgoing package.

It is to be especially observed that in our improved equipment for and method of low temperature storing, distributing and dispensing of articles or packages as herein described and illustrated, the articles or packages are so disposed in the insulated enclosure with respect to all fixed and moving segments of the conveyor as to reduce to a minimum the opportunity for the following adverse effects upon them, which have heretofore been controlling in the design and construction of this equipment of this nature:

(1) Cumulative forces;
(2) Frost accumulations; and
(3) Lack of dynamic balance of conveyor.

As to the foregoing, there are no cumulative forces involved in our improved equipment since each package is subjected to only those forces, limited by gravity, acting upon the weight of the packages plus friction limited by the tangential contact between the packages and the cylindrical shapes composing the guide and moving members of the conveyor. The absence of frost or frost accumulations in our improved equipment is due to the disposition of the evaporator surfaces with respect to the discharge mechanism and its position in the cabinet. The dynamic balance of the movant for the packages or articles is an additional feature of our present distributing equipment since it limits the power factor necessary to actuate the entire mechanism.

In the embodiment of our invention illustrated, the top of the package race defined by the outer guide 21 and the two inner guides 22 and 23 is approximately level with the bottom of the discharge opening or outlet 17 of the cabinet 11, and the bottom of the feed chute or magazine 52 is at substantially this same level. Moreover, by the critical placement of the evaporator plates 16, the top of one of the upper set of evaporators is also level with the top of the race as well as with the bottom of outlet 17. In addition, it should be observed that there are no openings in the cabinet 11 below the bottom of the discharge outlet 17. Consequently, cold air, being heavier than warm air, can only escape from the housing or cabinet 11 through package outlet 17 and, conversely, warm air can only enter through this same opening but, on entering, will remain suspended on the cold air because of the differences in specific gravity.

Because of our construction, hereinabove described, the accumulation of frost within the insulated enclosure 11 is limited to the cold or condensing zone, the bottom of which is at or near the bottom of the package outlet 17, and by reason of mounting the mechanism for storing, moving and dispensing the packages for the most part so that the top thereof is below the bottom of the discharge outlet, none of the mechanism is subject to frosting since it is located below the zone where frost can occur. Consequently, the zone in which the mechanism is located is cold and dry at all times, and the mechanism will function successfully therein despite such extremely low temperatures.

We claim:

1. In an insulated enclosure except for an inlet in the top thereof and an outlet adjacent to the top thereof, means for feeding a plurality of individual packages successively into said enclosure through said inlet, and mechanism confined within said enclosure for moving the packages from one end of said enclosure for discharge through said outlet; said mechanism comprising an irregular helix consisting of a plurality of flights for receiving the packages and defining a path through which the packages move, an upper shaft, a lower shaft, pairs of sprocket gears on said upper and lower shafts adjacent opposite ends thereof, chains trained around an upper and a lower sprocket gear of each of said pairs of sprocket gears, cross-bars secured to said chains in spaced relationship and within said helix, means for rotating said upper and lower shafts in unison to move said bars whereby the individual packages are lowered and conveyed and lifted into, through and from said helix for discharge from said outlet.

2. In package distributing equipment including an insulated enclosure having an inlet in the top thereof and an outlet adjacent to the top thereof, mechanism within said enclosure for receiving, conveying and discharging successive packages through said enclosure; said mechanism comprising a pair of irregular helices arranged in spaced relationship and defining an irregular path of travel of the packages, each irregular helix of said pair of irregular helices including an upper curved section approximating 180° and a lower curved section approximating 180° joined at their ends by straight sections, an upper shaft, a lower shaft, pairs of sprocket gears on said upper and lower shafts adjacent opposite ends thereof, chains trained around an upper and a lower sprocket gear of each pair of sprocket gears, cross-bars secured to said chains in spaced relationship and within the path defined by said pair of spaced irregular helixes; said cross-bars upon movement traveling through straight paths during a portion of their movement which are substantially parallel to said straight sections of said helices and through curved paths during the remainder of their movement adjacent to but non-parallel to the curved sections of said helices whereby the packages are moved freely in paths around said curved sections without becoming damaged or jammed, and means for rotating said upper and lower shafts in unison to move said cross-bars whereby the individual packages are lowered, conveyed and lifted into through and from said irregular helical path for discharge from said closure through said outlet.

References Cited in the file of this patent
UNITED STATES PATENTS

| | | |
|---|---|---|
| 1,380,626 | Ayars | June 7, 1921 |
| 1,442,953 | Kehoe | Jan. 23, 1923 |
| 1,483,777 | Callahan | Feb. 12, 1924 |
| 1,562,280 | Barry | Nov. 17, 1925 |
| 1,891,425 | Kronquest | Dec. 20, 1932 |
| 2,154,696 | Phelps et al. | Apr. 18, 1939 |
| 2,227,477 | Williamson | Jan. 7, 1941 |
| 2,254,420 | Cleveland | Sept. 2, 1941 |
| 2,272,750 | Miller | Feb. 10, 1942 |
| 2,274,292 | Hiller | Feb. 24, 1942 |
| 2,296,154 | Elliott | Sept. 15, 1942 |
| 2,314,632 | Rear | Mar. 23, 1943 |
| 2,452,837 | Colbert | Nov. 2, 1948 |
| 2,482,245 | Childers | Sept. 20, 1949 |
| 2,500,679 | Hawley | Mar. 14, 1950 |
| 2,511,076 | Partridge | June 13, 1950 |
| 2,589,099 | Larkin | Mar. 11, 1952 |
| 2,621,994 | Sadler | Dec. 16, 1952 |
| 2,633,958 | Childers | Apr. 7, 1953 |